United States Patent

Deaner et al.

(10) Patent No.: US 7,738,504 B1
(45) Date of Patent: Jun. 15, 2010

(54) METHOD OF ESTABLISHING AND UPDATING MASTER NODE IN COMPUTER NETWORK

(75) Inventors: Jeffrey V. Deaner, Columbia, MD (US); John D. Harbaugh, Ft Meade, MD (US); Thomas H. Lotze, College Park, MD (US); Daniel L. Lough, Warrenton, VA (US); Elliott Dorham, Aldie, VA (US)

(73) Assignee: The United States of America as represented by the Director National Security Agency, Washington, DC (US)

( * ) Notice: Subject to any disclaimer, the term of this patent is extended or adjusted under 35 U.S.C. 154(b) by 66 days.

(21) Appl. No.: 12/317,293

(22) Filed: Dec. 22, 2008

(51) Int. Cl.
*H04J 3/06* (2006.01)

(52) U.S. Cl. ........................ 370/503; 370/400; 709/208; 375/356

(58) Field of Classification Search ........................ None
See application file for complete search history.

(56) References Cited

U.S. PATENT DOCUMENTS

| | | | |
|---|---|---|---|
| 5,257,356 A * | 10/1993 | Brockmann et al. | 710/110 |
| 5,461,608 A | 10/1995 | Yoshiyama | |
| 5,566,180 A * | 10/1996 | Eidson et al. | 370/473 |
| 5,805,837 A * | 9/1998 | Hoover et al. | 710/110 |
| 6,665,316 B1 * | 12/2003 | Eidson | 370/509 |
| 6,950,855 B2 | 9/2005 | Sampathkumar | |
| 7,269,648 B1 | 9/2007 | Krishnan et al. | |
| 7,421,478 B1 * | 9/2008 | Muchow | 709/209 |
| 7,587,465 B1 * | 9/2009 | Muchow | 709/209 |
| 2005/0125501 A1 | 6/2005 | Inomoto et al. | |
| 2007/0101016 A1 | 5/2007 | Boyd et al. | |
| 2007/0266119 A1 * | 11/2007 | Ohly | 709/220 |
| 2008/0107218 A1 * | 5/2008 | Geissler et al. | 375/356 |

\* cited by examiner

*Primary Examiner*—Bob A Phunkulh

(57) ABSTRACT

A method of establishing and updating a master node in a computer network by scoring each node in the network as a function of its physical attributes, designating the highest scoring node as the master node, sending a periodic message by the master node with its score and a request for non-master node scores, sending a message by a non-master node to the master node requesting relinquishment of master node status if the non-master node has a higher score, relinquishing master node status to a non-master node with a higher score and returning to the third step, and declaring by a non-master node that it is a master node if it has not received a message from the previously designated master node in a user-definable period of time and returning to the third step.

14 Claims, 1 Drawing Sheet

METHOD OF ESTABLISHING AND UPDATING MASTER NODE IN COMPUTER NETWORK

FIELD OF INVENTION

The present invention relates, in general, to electrical computers and digital processing systems and, in particular, to multi-computer data transfer.

BACKGROUND OF THE INVENTION

Individual computers (commonly referred to as nodes) may be electronically connected together into a cluster to form a unified, powerful computing network. One node (commonly referred to as a master node) is selected to coordinate the activities of the non-master, or slave, nodes in the network. A master node typically initiates actions and controls decision making of non-master nodes in a network. The master node also tasks non-master nodes. A master node may malfunction, or a node may be added to a network that is more suited to be the master node than the designated master node. Therefore, there is a need for a method of establishing and updating a master node in a computer network.

U.S. Pat. No. 5,461,608, entitled "RING NETWORK WITH TEMPORARY MASTER NODE FOR COLLECTING DATA FROM SLAVE NODES DURING FAILURE," discloses a device for and method of a slave node acting as a temporary master node if it does not receive a command message from the permanent master node. The permanent master node is assigned priority zero, whereas the slave nodes are assigned values one to four. If a slave node does not receive a command message from the permanent master node then it acts as a master node by assigning values one to four to nodes it considers slave nodes and sending out command messages to supposed slave nodes. The temporary node repeats this process until it receives a response from a node with a higher priority. The present invention does not allow slave nodes to assign priority values to other nodes, and does not allow slave nodes to send command messages as does U.S. Pat. No. 5,461,608. U.S. Pat. No. 5,461,608 is hereby incorporated by reference into the specification of the present invention.

U.S. Pat. No. 6,950,855, entitled "MASTER NODE SELECTION IN CLUSTERED NODE CONFIGURATION," discloses a device for and method of selecting a primary master node and a secondary master node (i.e., a master node pair) from an optimal combination of node pairs, where the optimal combination is found by searching for the maximum total availability potential of the network. The availability potential is a sum of participation indexes of a node pair minus a hamming distance between the node pair, where the hamming distance is the number of node groups the node pair do not share in common. If a master node pair does not exist in a node group then a master node is selected. The present invention does not calculate a hamming distance, sum participation indices to arrive at an availability potential, or determine an optimal combination from the availability potential as does U.S. Pat. No. 6,950,855. U.S. Pat. No. 6,950,855 is hereby incorporated by reference into the specification of the present invention.

U.S. Pat. No. 7,269,648, entitled "RESOLVING MULTIPLE MASTER NODE CONFLICTS IN A DDB," discloses a device for and method of selecting a master node by a global administrator. If the security of the global administrator is breached then other users may select master nodes. If there is a conflict between master nodes then the most recently selected master node is selected as the master node. The present invention does not require a global administrator, does not allow others to select global nodes if the security of a global administrator is breached, and does not resolve conflicts between master nodes by selecting the most recently selected master node as does U.S. Pat. No. 7,269,648. U.S. Pat. No. 7,269,648 is hereby incorporated by reference into the specification of the present invention.

U.S. Pat. Appl. No. 20050125501, entitled "METHOD AND APPARATUS FOR SETTING MASTER NODE OF RING NETWORK," discloses a device for and method of setting a master node of a ring network, having adjacently connected nodes situated on rightward and leftward lines of a bi-directional transmission channel. The master node selected is one that has a number of interposed nodes counted from the leftward line that is either equal to or one less the number of interposed nodes counted from the rightward line. The present invention does not count the number of interposed nodes from either a leftward line or a rightward line and does not use such a result to choose a master node as does U.S. Pat. Appl. No. 20050125501. U.S. Pat. Appl. No. 20050125501 is hereby incorporated by reference into the specification of the present invention.

U.S. Pat. Appl. No. 20070101016, entitled "METHOD FOR CONFIRMING IDENTITY OF A MASTER NODE SELECTED TO CONTROL I/O FABRIC CONFIGURATION IN A MULTI-HOST ENVIRONMENT," discloses a method of determining the root, or master node, when it is in doubt. The method is to compare the identification fields of the two nodes in question and determining that the master node is the one with the higher number in its identification field. The present invention does not compare the identification fields of two nodes in question to determine that the master node is the one with the higher number in its identification field as does U.S. Pat. Appl. No. 20070101016. U.S. Pat. Appl. No. 20070101016 is hereby incorporated by reference into the specification of the present invention.

SUMMARY OF THE INVENTION

It is an object of the present invention to establish and update a master node in a computer network.

The present invention is a method establishing and updating a master node in a computer network.

The first step of the method is scoring each node in a network, where each node's score is a function of the node's physical attributes.

The second step of the method is designating the node that was scored the highest as the master node.

The third step of the method is periodically sending a message by the master node declaring that it is the master node, including its score, and requesting each non-master node to send the master node its score, if it has not done so already, where the period is user-definable.

The fourth step of the method is sending a message by a non-master node to the master node requesting that it relinquish master node status to the non-master node if the non-master node has a higher score than the master node.

The fifth step of the method is relinquishing master node status by the master node to a non-master node if the non-master node has a higher score than does the master node and returning to the third step.

The sixth step of the method is declaring by a non-master node that it is the master node if it has not received a message from the master node in a user-definable period of time and returning to the third step.

DETAILED DESCRIPTION

Figure 1:
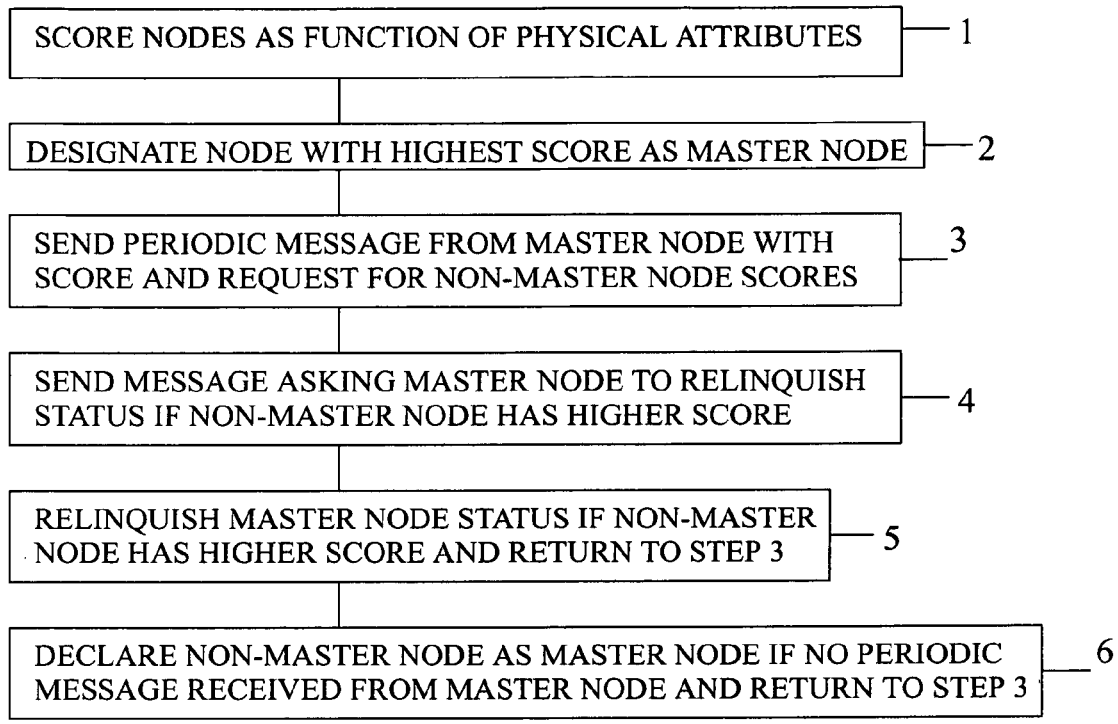
FIG. 1 is a flowchart of the present invention.

The present invention is a method of establishing and updating a master node in a computer network.

FIG. 1 is a flowchart of the present invention.

The first step 1 of the method is scoring each node in a network, where each node's score is a function of the node's physical attributes. In the preferred embodiment, physical attributes of a node that are scored include processor type, number of processors, type of operating system, version of operating system, Internet protocol (IP) address, type of memory, memory amount, amount of available hard-drive space, presence of a video card, presence of a virtual machine, available bandwidth, latency characteristics, type of bus controllers, number of bus controllers, type of input/output devices, and number of input/output devices. A user-definable number is given for each user-definable unit of each physical attribute. Each component in the score is given a user-definable weight. A user-definable function (e.g., sum, ratio, product) is used to combine the component scores to form the score for a node.

The second step 2 of the method is designating the node that was scored the highest in the first step 1 as the master node.

The third step 3 of the method is periodically sending out a message by the master node declaring that it is the master node. Included in the message is the master node's score and a request that each non-master node in the network send the master node its score, if it has not done so already. The master node sends out this message periodically, where the period is user-definable.

The fourth step 4 of the method is sending out a message by a non-master node to the master node requesting that it relinquish master node status to the non-master node if the non-master node has a higher score than the master node.

The fifth step 5 of the method is relinquishing master node status by the master node to a non-master node if the non-master node has a higher score than does the master node and returning to the third step 3.

The sixth step 6 of the method is declaring by a non-master node that it is the master node if it has not received a message from the master node in a user-definable period of time and returning to the third step 3. In the preferred embodiment, the user-definable period is twice that of the user-definable period set in the third step 3.

If a non-master node's physical attributes change, its score is recalculated accordingly and sent to the master node.

If the master node's physical attributes change, its score is recalculated accordingly and sent to the non-master nodes via the periodic message the master node sends to the non-master nodes.

What is claimed is:

1. A method of establishing and updating a master node in a computer network comprising a plurality of nodes, comprising the steps of:
    a) scoring each node in the network according to its physical attributes;
    b) designating the node with the highest score as the master node;
    c) sending a message periodically by the master node declaring that it is the master node, where the message includes the master node's score, where the message requests each non-master node to send its node score to the master node, if it has not done so already, and where the period is user-definable;
    d) sending a message by a non-master node to the master node requesting that it relinquish master node status to the non-master node if the non-master node has a higher score than the master node;
    e) relinquishing master node status by the master node to a non-master node if the non-master node has a higher score than the master node and returning to step (c); and
    f) declaring by a non-master node that it is a master node if it has not received a message from the previously designated master node in a user-definable period of time and returning to step (c).

2. The method of claim 1, wherein the step of scoring each node in the network according to its physical attributes is comprised of the step of scoring each node in the network according to its physical attributes, where its physical attributes are selected from the group of physical attributes comprising processor type, number of processors, type of operating system, version of operating system, Internet protocol (IP) address, type of memory, memory amount, amount of hard-drive space, presence of a video card, presence of a virtual machine, available bandwidth, latency characteristics, type of bus controllers, number of bus controllers, type of input/output devices, and number of input/output devices.

3. The method of claim 1, wherein the step of scoring each node in the network is comprised of the step of scoring each node in the network, where a user-definable number is given for each user-definable unit of physical attribute of the node.

4. The method of claim 1, wherein the step of scoring each node in the network is comprised of the step of scoring each node in the network, where each component in the score is given a user-definable weight.

5. The method of claim 1, wherein the step of scoring each node in the network is comprised of the step of scoring each node in the network, where a user-definable function is selected from the group of user-definable functions consisting of sum, ratio, and product is used to combine component scores to form the score for a node.

6. The method of claim 1, wherein the step of declaring by a non-master node that it is a master node if it has not received a message from the previously designated master node in a user-definable period of time and returning to step (c) is comprised of the step of declaring by a non-master node that it is a master node if it has not received a message from the previously designated master node in a user-definable period of time and returning to step (c), where the user-definable period of time in step (f) is twice that of the user-definable period set in step (c).

7. The method of claim 1, further including the step of recalculating the score of a non-master node whose physical attributes have changed and sending the score to the master node.

8. The method of claim 1, further including the step of recalculating the score of a master node whose physical attributes have changed and sending the score to the non-master nodes via the periodic message sent by the master node to the non-master nodes.

9. The method of claim 2, wherein the step of scoring each node in the network is comprised of the step of scoring each node in the network, where a user-definable number is given for each user-definable unit of physical attribute of the node.

10. The method of claim 9, wherein the step of scoring each node in the network is comprised of the step of scoring each node in the network, where each component in the score is given a user-definable weight.

11. The method of claim 10, wherein the step of scoring each node in the network is comprised of the step of scoring each node in the network, where a user-definable function is selected from the group of user-definable functions consisting of sum, ratio, and product is used to combine component scores to form the score for a node.

12. The method of claim 11, wherein the step of declaring by a non-master node that it is a master node if it has not received a message from the previously designated master node in a user-definable period of time and returning to step (c) is comprised of the step of declaring by a non-master node that it is a master node if it has not received a message from the previously designated master node in a user-definable period of time and returning to step (c), where the user-definable period of time in step (f) is twice that of the user-definable period set in step (c).

13. The method of claim 12, further including the step of recalculating the score of a non-master node whose physical attributes have changed and sending the score to the master node.

14. The method of claim 13, further including the step of recalculating the score of a master node whose physical attributes have changed and sending the score to the non-master nodes via the periodic message sent by the master node to the non-master nodes.

* * * * *